US012561628B2

(12) United States Patent
Jha et al.

(10) Patent No.: US 12,561,628 B2
(45) Date of Patent: Feb. 24, 2026

(54) BRANCH AND BOUND FOR COMBINATORIAL OPTIMIZATION IN PARTIALLY OBSERVABLE ENVIRONMENTS

(71) Applicant: Dell Products L.P., Round Rock, TX (US)

(72) Inventors: Saurabh Jha, Austin, TX (US); Sailendu Kumar Patra, Bangalore (IN); Priya Shanmugasundaram, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 18/633,857

(22) Filed: Apr. 12, 2024

(65) Prior Publication Data

US 2025/0322331 A1     Oct. 16, 2025

(51) Int. Cl.
*G06Q 10/0631* (2023.01)
(52) U.S. Cl.
CPC ............................. *G06Q 10/063118* (2013.01)
(58) Field of Classification Search
CPC ................................................ G06Q 10/06318
See application file for complete search history.

(56) References Cited

U.S. PATENT DOCUMENTS

| | | | | |
|---|---|---|---|---|
| 2002/0082889 A1* | 6/2002 | Oliver | .............. | G06Q 10/06375 705/7.17 |
| 2009/0198534 A1* | 8/2009 | Brown | ................... | G06Q 10/06 705/7.39 |
| 2012/0311607 A1* | 12/2012 | Achterberg | ............... | G06F 9/52 718/107 |
| 2015/0286982 A1* | 10/2015 | Dwyer | ................. | G06Q 10/067 705/7.17 |
| 2019/0188630 A1* | 6/2019 | Wu | ...................... | G06Q 10/087 |

(Continued)

FOREIGN PATENT DOCUMENTS

| | | | | |
|---|---|---|---|---|
| CA | 3116855 A1 * | 4/2020 | ............. | G06N 3/047 |

OTHER PUBLICATIONS

Panzer et al. "Neural agent-based production planning and control: An architectural review" (2022) (https://www.sciencedirect.com/science/article/pii/S027861252200190X) (Year: 2022).*

*Primary Examiner* — Sujay Koneru
(74) *Attorney, Agent, or Firm* — Chamberlain, Hrdlicka, White, Williams & Aughtry; Aly Z. Dossa

(57) ABSTRACT

A method for managing order processing includes obtaining a set of time series datasets associated with the order processing for an order processing system, generating a state space for the set of time series datasets using bi-partite graph representations for a mixed integer program (MIP), applying a transition function on the state space to obtain state-to-state transition function, performing a graph embedding on the state-to-state transition function to obtain historical transition data, applying a transformer multi-head attention function on the historical transition data to obtain positional encodings of observation history and feature representation, and perform an agent deployment on an order processing system based on finalized state-to-state transition functions, wherein the finalized state-to-state transition functions are based on the positional encodings.

11 Claims, 5 Drawing Sheets

(56)  References Cited

U.S. PATENT DOCUMENTS

| | | | |
|---|---|---|---|
| 2021/0342787 A1* | 11/2021 | Williams | G06Q 10/1053 |
| 2021/0375289 A1* | 12/2021 | Zhu | G10L 15/22 |
| 2021/0409430 A1* | 12/2021 | Alford | H04L 67/133 |
| 2022/0187847 A1* | 6/2022 | Cella | G06Q 10/06395 |
| 2022/0226994 A1* | 7/2022 | Gombolay | B25J 9/1656 |
| 2022/0318720 A1* | 10/2022 | Li | G06Q 10/06316 |
| 2023/0078448 A1* | 3/2023 | Cella | G06Q 10/06311 |
| | | | 705/7.13 |
| 2023/0168411 A1* | 6/2023 | Marvaniya | G01W 1/10 |
| | | | 706/12 |
| 2023/0367961 A1* | 11/2023 | Jha | G06N 3/043 |
| 2023/0385612 A1* | 11/2023 | Krishna | G06N 3/088 |
| 2024/0126794 A1* | 4/2024 | Cook | H04L 51/02 |
| 2024/0169180 A1* | 5/2024 | Yang | G06N 3/063 |
| 2025/0117858 A1* | 4/2025 | Young | G06N 3/0455 |
| 2025/0190856 A1* | 6/2025 | Dayama | G06N 3/088 |

* cited by examiner

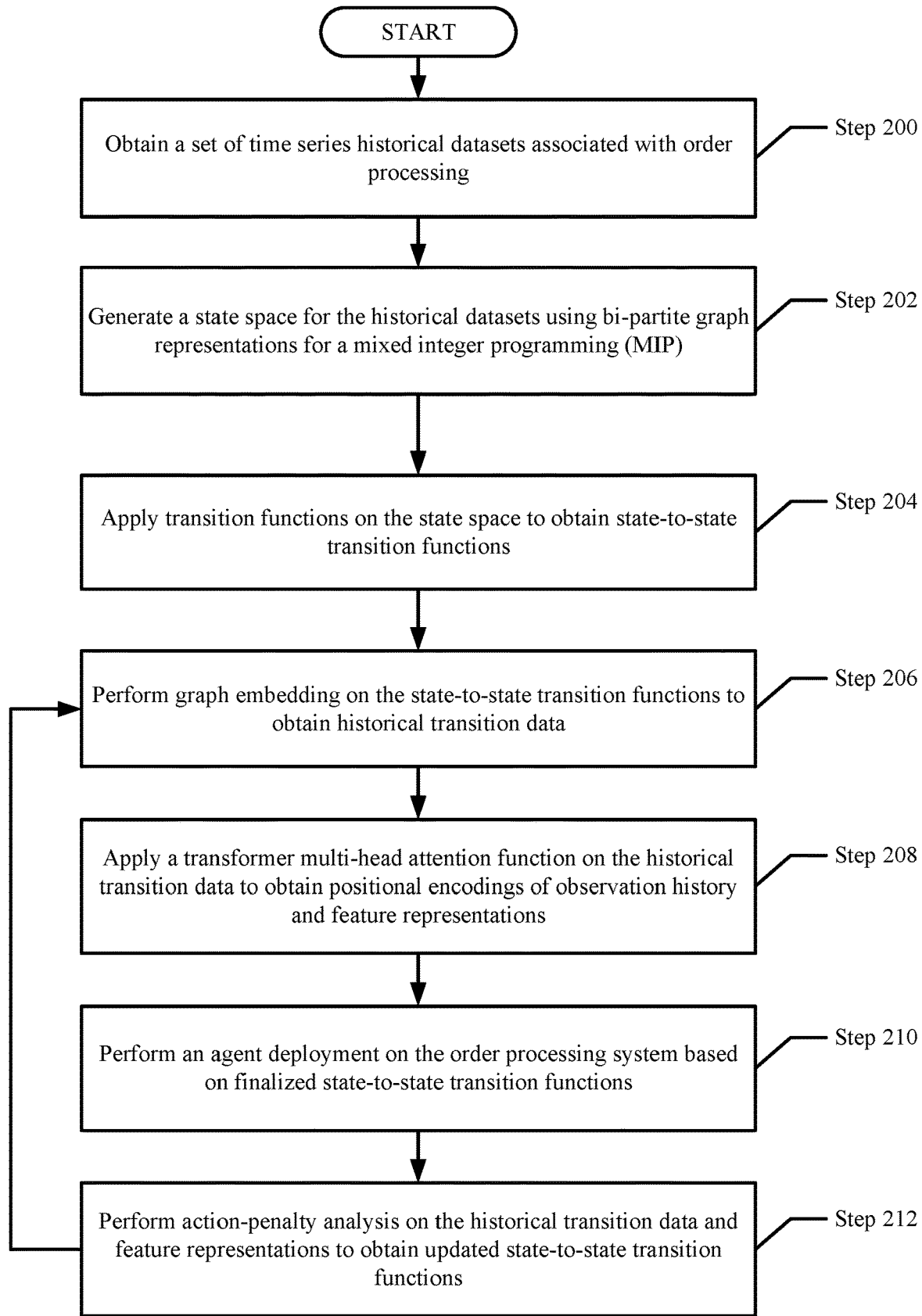

START

Obtain a set of time series historical datasets associated with order processing — Step 200

Generate a state space for the historical datasets using bi-partite graph representations for a mixed integer programming (MIP) — Step 202

Apply transition functions on the state space to obtain state-to-state transition functions — Step 204

Perform graph embedding on the state-to-state transition functions to obtain historical transition data — Step 206

Apply a transformer multi-head attention function on the historical transition data to obtain positional encodings of observation history and feature representations — Step 208

Perform an agent deployment on the order processing system based on finalized state-to-state transition functions — Step 210

Perform action-penalty analysis on the historical transition data and feature representations to obtain updated state-to-state transition functions — Step 212

FIG. 2

Computer
500

BRANCH AND BOUND FOR COMBINATORIAL OPTIMIZATION IN PARTIALLY OBSERVABLE ENVIRONMENTS

BACKGROUND

Order processing and query incident management are branches of a corporate entity that manage the purchases between customers and the corporate entity. The corporate entity may manage the deployment of agents for the purposes of providing order processing services. The deployment of agents may involve the consumption of resources, so it may be beneficial to accurately deploy a proper number of agents based on an expected volume of orders to be processed.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2 shows a flowchart of a method of generating forecasting models in accordance with one or more embodiments of the invention.

DETAILED DESCRIPTION

Figure 1:
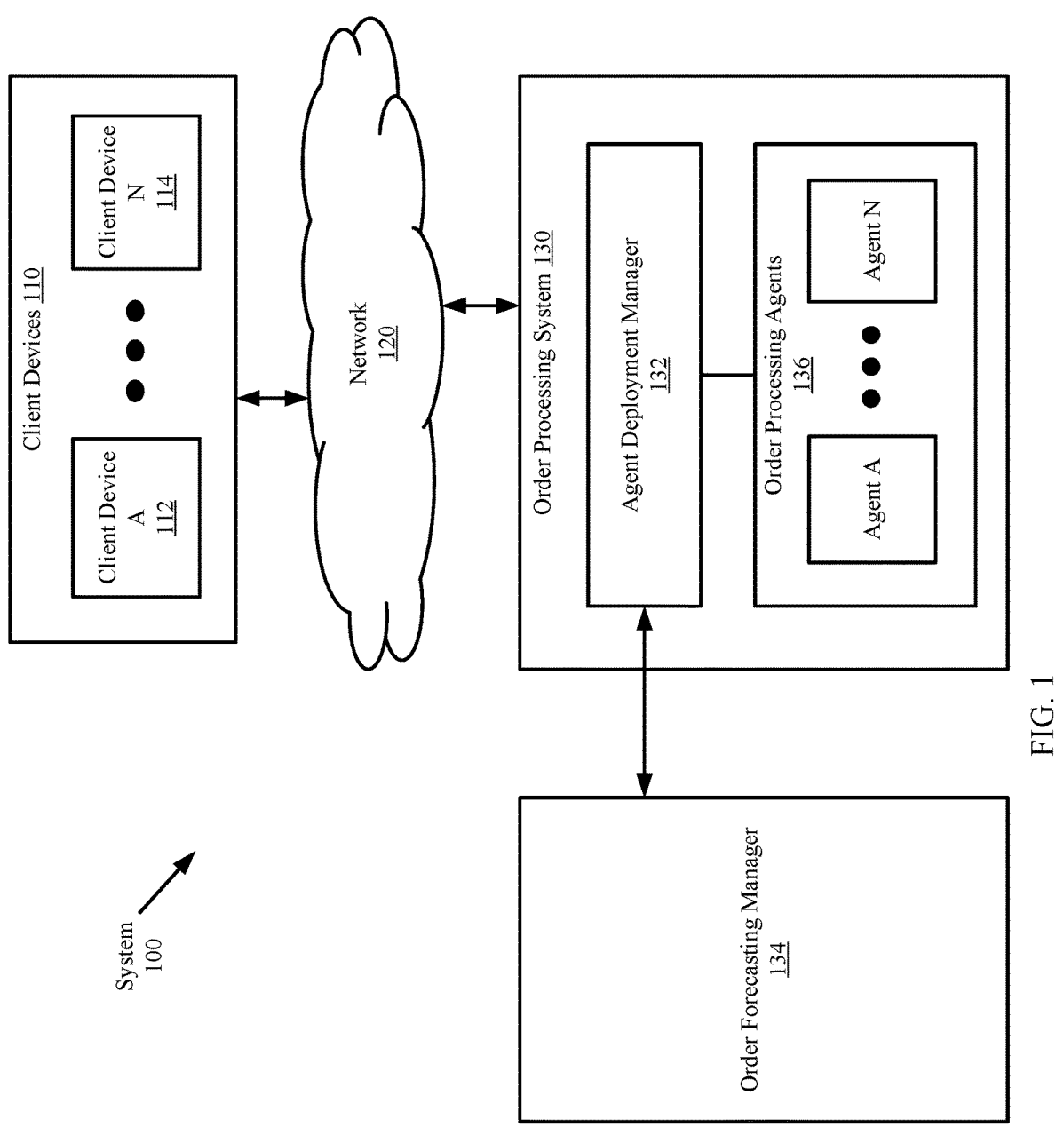
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein include methods and systems for managing order processing of a corporate entity. Embodiments disclosed herein include tracking the number of orders processed over a period of time for multiple epicenters (e.g., branches of the corporate entity), storing each of the tracked number of orders as a time series dataset. A processing of the set of time series datasets in accordance with one or more embodiments of the invention includes generating state spaces based on selections of an agent deployment of a number of processing agents. The result of applying the decision pipeline to the time series historical datasets include one or more forecasting models. The forecasting models may be used for managing the resource distribution applied for order processing. For example, if the forecasting models specify increase in order volumes, the resource distribution may include increasing a number of agents deployed for the purposes of order processing. Further, if the forecasting models specify a relative decrease in order volumes, the resource distribution may include increasing a number of agents deployed for the purposes of order processing.

The following describes various embodiments of the invention.

FIG. 1 shows a system in accordance with one or more embodiments of the invention. The system (100) includes any number of client devices (110), a network (120), an order processing system (130), and an order forecasting manager (134). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments of the invention, the order processing system (130) may provide computer-implemented services to users. The computer-implemented services may include deploying order processing agents (136) (also referred to as processing agents (136)) that aid in communicating with the client devices (110) to process orders for new products. Examples of computer-implemented services include transactions for purchasing the new products, customer support systems (such as online chat services), tracking and managing inventory, initiating shipping of products, order tracking, managing customer communication with the client devices (112, 114), and providing information to the client devices (110) that include information about previous orders, transaction information associated with current, past, or future orders, and/or any other information associated with the processing of one or more orders.

The volume of orders may impact the required number of order processing agents (136). In one or more embodiments, the processing of orders are performed using order processing agents (136) of the order processing system. The order processing agents (136) may each include functionality to communicate with the client devices (110) to provide the aforementioned services based on products offered by a corporate entity managing the order processing system (130).

Figure 4:
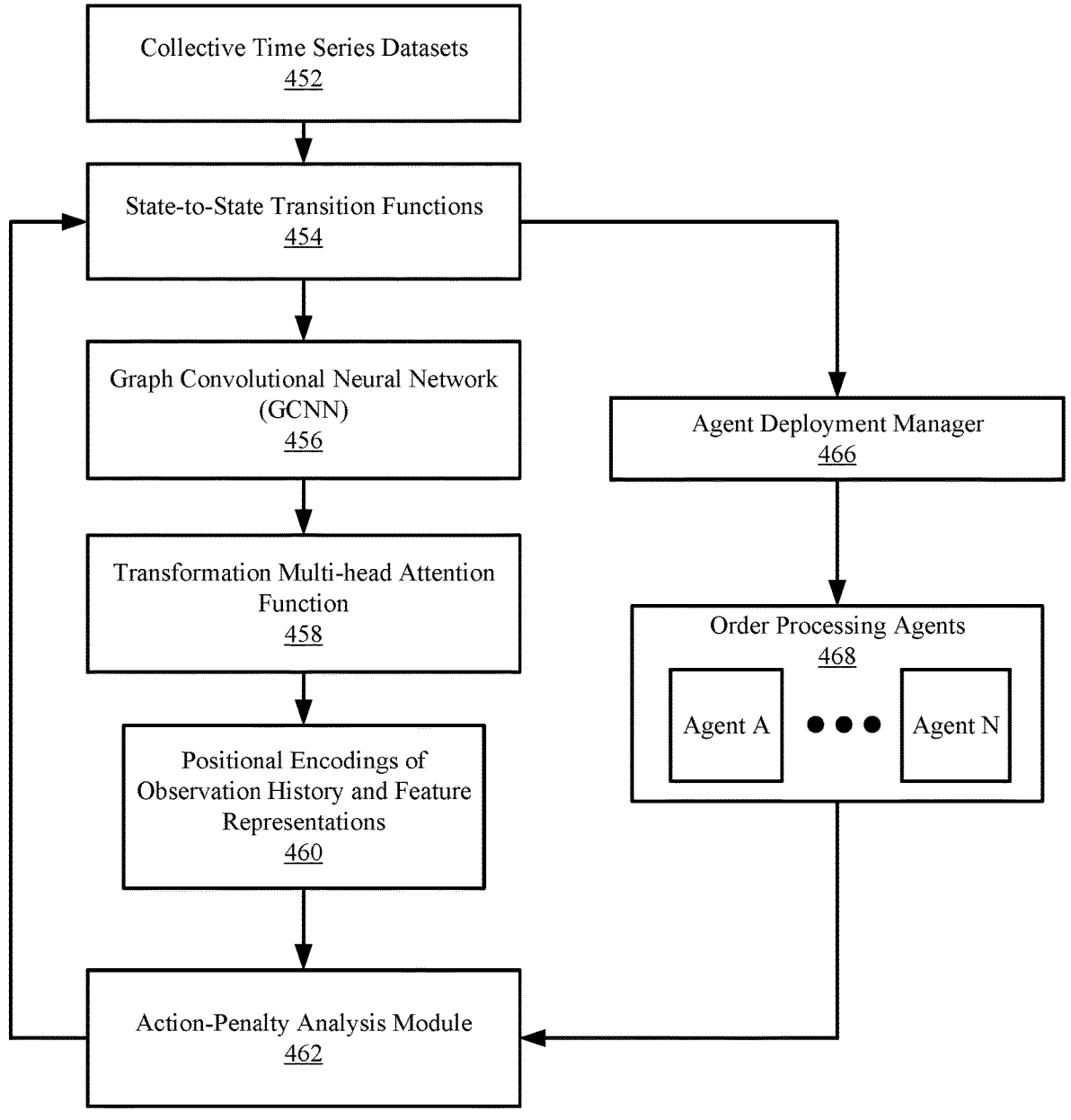
FIG. 4 shows a diagram of an example system in accordance with one or more embodiments of the invention.

In one or more embodiments of the invention, the order processing system (130) (and/or any components illustrated within) may be implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the order processing system (130) (and/or any components illustrated within) described throughout this present disclosure.

Alternatively, in one or more embodiments of the invention, the order processing system (130) (and/or any components illustrated within) may be implemented as logical devices. A logical device may utilize the computing resources of any number of computing devices to provide the functionality of the order processing system (130) (and/or any components illustrated within) described throughout this present disclosure.

In one or more embodiments, the deployment of the processing agents (136) is managed by an agent deployment manager (132). In one or more embodiments, the agent deployment manager (132) includes functionality for assigning each of the order processing agents (136) to service the client devices (110) in accordance with the functionality of the order processing system (130) discussed throughout this disclosure. The agent deployment manager (132) may make determinations for when to boot up the order processing agents (136), when to assign each of the processing agents (136) on standby, and/or when to reduce the number of processing agents (136) providing the services of the order processing system (130). Further, the agent deployment manager (132) may initiate the booting or powering down of the processing agents (136) in accordance with the aforementioned determinations.

To make such determinations, the agent deployment manager (132) may utilize the functionality of the order forecasting manager (134). While illustrated as a separate entity, the order forecasting manager (134) may be a component of the order processing system (130) without departing from the invention. The order forecasting manager (134) may include functionality for generating order forecasts for a given period of time. The order forecasts may be generated as forecasting sequences which may be represented as, for example, graphical Fourier transform. The forecasting sequences may represent outputs of an expected volume of orders for a point in time. In one or more embodiments, the expected volume of orders for a point in time may be an estimated average number of orders that an epicenter of a corporate entity is predicted to process over a predefined period of time (e.g., a week). In one or more embodiments, an epicenter of a corporate entity is a logical partitioning of entities within the corporate entity based on factors such as geographical regions in which the entities of the corporate entity operate. The entities may be, for example, employees and the computing devices used by the employees to provide the services (or enable the computing devices to provide said services) of the order processing system (130).

In one or more embodiments, the order forecasting manager (134) performs the generation of the forecasting models using the methods described in FIG. 2. The order forecasting manager (134) may perform other methods to generate the forecasting models in accordance with one or more embodiments of the invention.

Figure 5:
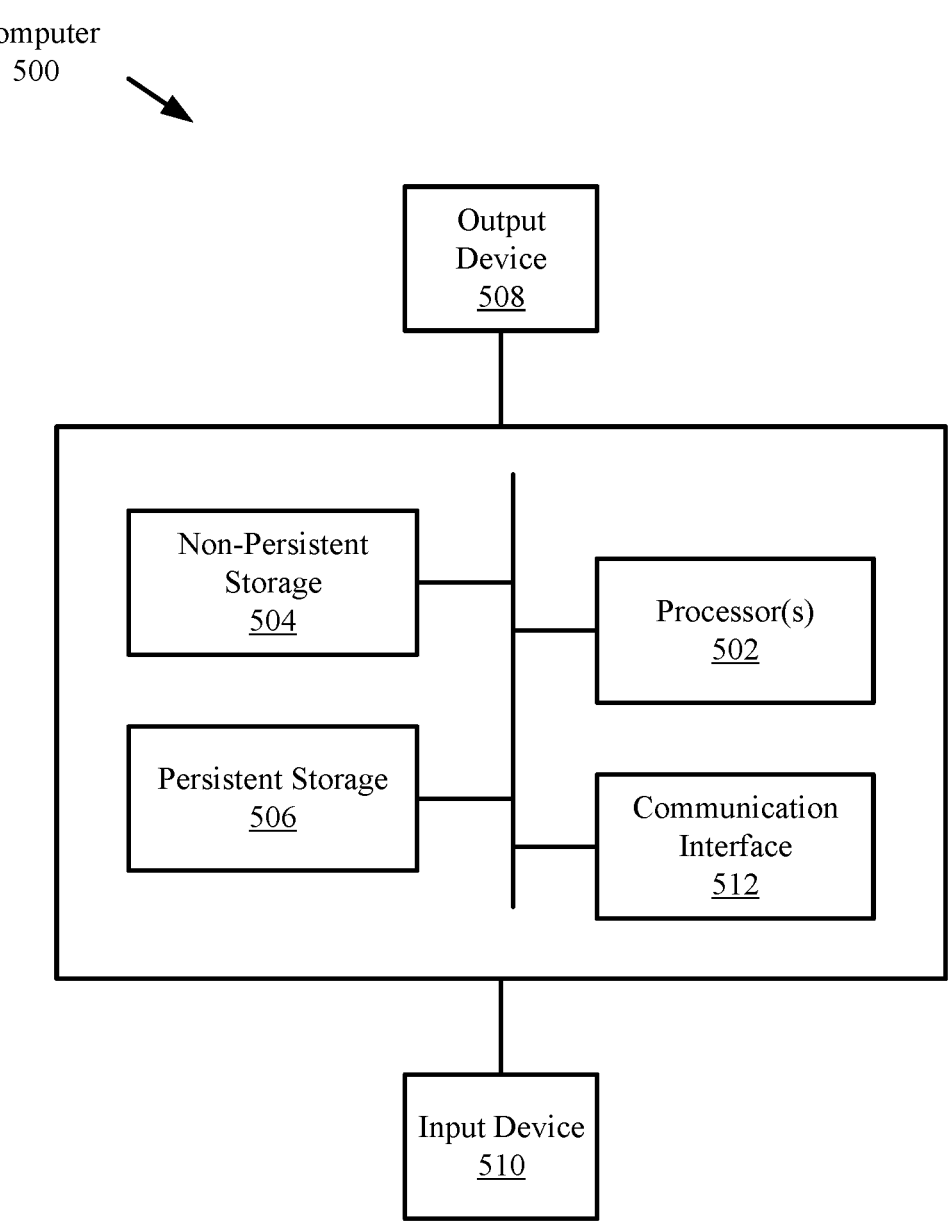
FIG. 5 shows a diagram of a computing device in accordance with one or more embodiments of the invention.

In one or more embodiments of the invention, the order forecasting manager (134) (and/or any components within) may be implemented as one or more computing devices (e.g., 500, FIG. 5). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the order forecasting manager (134) (and/or any components within) described throughout this present disclosure including, for example, the method illustrated in FIG. 2.

Alternatively, in one or more embodiments of the invention, the order forecasting manager (134) (and/or any components within) may be implemented as logical devices. A logical device may utilize the computing resources of any number of computing devices to provide the functionality of the order processing system (130) (and/or any components illustrated within) described throughout this present disclosure including, for example, the method illustrated in FIG. 2.

In one or more embodiments of the invention, the above-mentioned system (100) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

FIG. 2 shows a flowchart of a method of generating and implementing forecasting models in accordance with one or more embodiments of the invention. The method shown in FIG. 2 may be performed by, for example, an order forecasting manager (e.g., 134, FIG. 1). Other components of the system in FIG. 1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

Turning to FIG. 2, in step 200, a set of time series historical datasets are obtained. In one or more embodiments, the set of time series datasets are obtained from the order processing system. As discussed above, each time series dataset may be associated with an epicenter.

In step 202, a state space is generated for the historical datasets using bi-partite graph representations for a mixed integer programming (MIP). In one or more embodiments, given $A \in R^{m \times n}$, $b \in R^m$ and $c \in R^m$, and a subset $I \subseteq \{1, 2, \ldots, n\}$, the mixed integer program MIP=(A,b,c,I) linear in x is defined as follows, $z^* = \min\{c^T x | Ax \leq b, x \in Rn, x_j \in Z, \forall j \in I\}$ where the vectors in X are feasible solutions of the MIP if $X = \{x \in R^n | Ax \leq b, x \in R^n, x_j \in Z, \forall j \in I\}$, and $x^* \in X$ is an optimal solution if $c^T x^* = z^*$. The values of x may be integers. In one or more embodiments, MIP problems are solved by recursively splitting the problem into sub-problems using a branch and bound method, where the linear programming (LP) relaxation of the problem is used to circumvent the integrality requirements and to obtain the lower bound for the sub-problems.

In one or more embodiments, to clarify aspects of the branch and bound methods for optimization, the following description is provided: the LP relaxation of the MIP is defined as follows, $z\check{} = \min\{c^T x | Ax \leq b, x \in R^n\}$. The lower-bound for the sub-tree is provided by solving the above LP-relaxation and if the objective value of the LP relaxation $z\check{} \geq z\hat{}$ where $z\hat{} = c^T x\hat{}$ of the current best solution $x\hat{}$, then the node can be discarded. The optimal integer solution may always lie between the determined upper-bound and lower-bound for a node to be explored. The choice of the variable $x_j$ to be used for calculating these bounds, the choice of the nodes to be explored, and the cutting rules are different strategies used in solving MIP problems.

For any optimization problem defined as O=(W,f) with an objective function $f: W \to R$ and W as the search space which is the set of all valid solutions to O, the branch and bound algorithm aims to find an optimal solution $x^* \in \text{argmin}_x \in W^T f(x)$.

In one or more embodiments, the search space W is partitioned into disjoint sub-spaces by constructing a search tree T, which is then iteratively partitioned by selecting a subspace $G \subset W$ from the unexplored sub-spaces and checking for $x\hat{}' \in G$ has $f(x\hat{}') < f(x\hat{})$ for a feasible $x\hat{} \in W$ stored globally. If above condition is satisfied, the incumbent solution is updated and the subspace G is branched into sub-spaces $G_1, G_2, \ldots, G_k$ and the search continues iteratively. If $f(x\hat{}') \geq f(x\hat{})$, $\forall x \in G$, the subspace is abandoned and not searched further. Once the search is complete with no unexplored sub-spaces, the best incumbent solution is returned, and the search terminates.

Variable selection plays an important role in branch and bound methods as it prescribes the variable on which branching is to be performed. Selecting a wrong variable for branching can result in increase in the size of the search tree and can increase the computational complexity significantly. A purpose for the branch and bound method in accordance with one or more embodiments of the invention is to develop a high-quality far-sighted variable selection strategy that is capable of generalizing unseen expert data. One or more embodiments leverage reinforcement learning to achieve above goals by modelling the variable selection process as a Markov decision process (MDP). With the environment represented by the solver, a brancher agent states, actions, transition function and the reward function are described using the description of FIG. 3.

Figure 3:
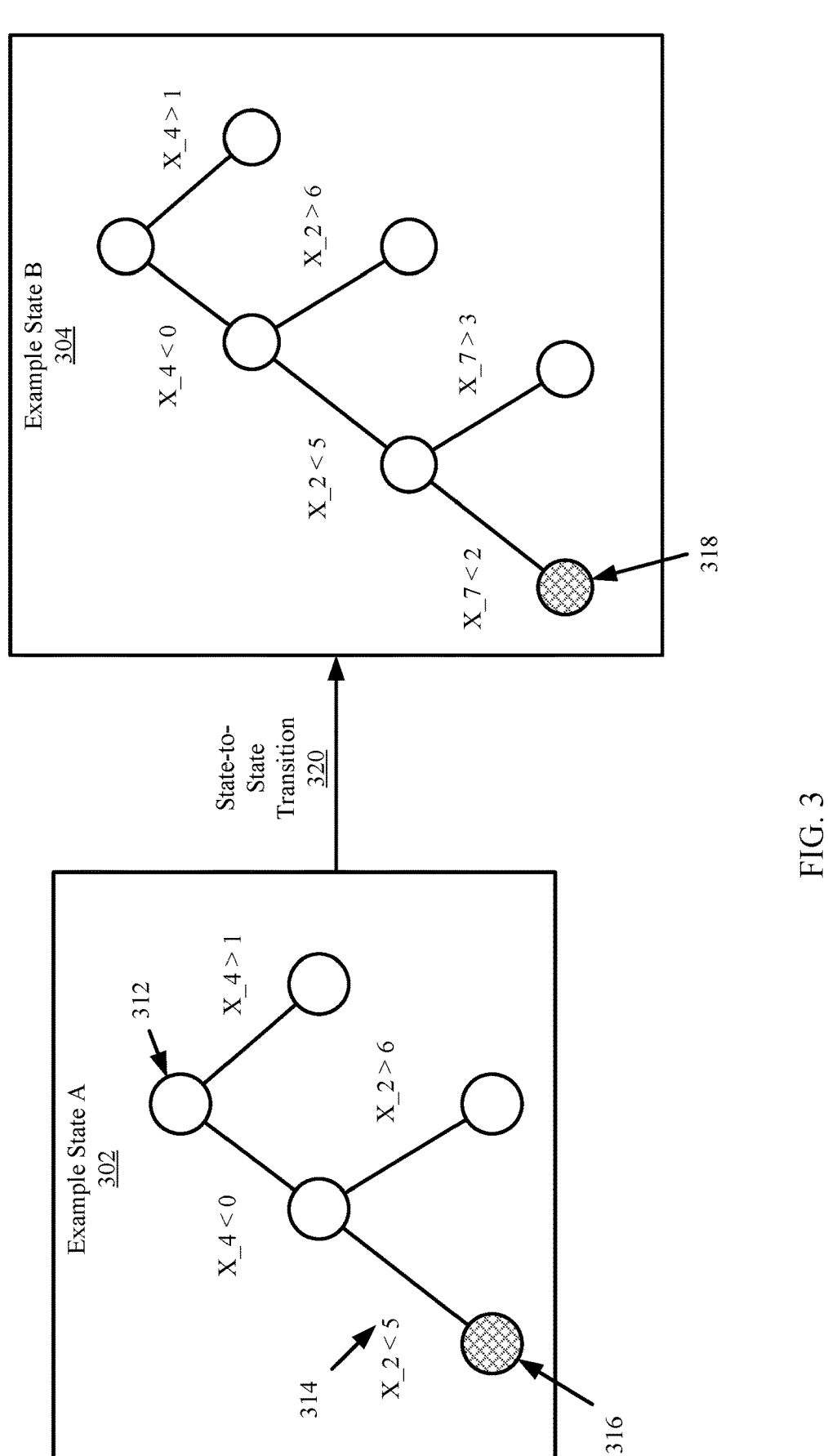
FIG. 3 shows a diagram of a state-to-state transition in accordance with one or more embodiments of the invention.

Turning to FIG. 3, FIG. 3 shows a diagram of an example state-to-state transition. The illustration of FIG. 3 may include an example state A (302) and a transition function (also referred to as a state-to-state transition (320)) being applied to the example state A (302) to obtain example state B (304) based on actions in an action space. Both example state A (302) and example state B (304) exist in the state space.

State Space S: In one or more embodiments, at each instance t, the problem state $s_t$ (e.g., 302) consists of the bi-partite graph representation for the MIP of the focus node (316) and the index set $I_t$ of the branching candidates which posses constraints on integers and have a non-integer solution. The state st is defined as below, $$s_t = \{(X_t, E_t, C_t), I_t\}$$

where $X \in R^{n \times d_x}$ is a feature matrix describing the variables and the features from the objective function and the constraints. The nodes, illustrated in FIG. 3 as circles (e.g., 312, 316, 318) of the bi-partite graph represent the n variables to be optimised and the m constraints to be met. An edge $e_{ij}$ is created if the variable $x_i$ has a corresponding $A_{ij} \neq 0$ in the constraint $c_j$ with features $d_e$ representing the constraint's constant term resulting in $E \in R^{m \times n \times d_e}$, the edge feature matrix. $C \in R^{m \times d_c}$ represents the constraint matrix where the constraints are encoded into $d_e$ features like in Gasse. Thus, the state $s_t$ presents a holistic representation of the variables, the objective function and the constraints involved in the MIP at any instance t.

Action Space A: The action at represents the branching variable selected at instance t from the action space where $I_t$ is the index set of branching variable candidates.

$$A(s_t) = \{i \in I_t\}$$

Transition Function P: The state transition function $P(s_{t+1} | s_t, a_t)$ generates the next state provided the current state and action. The next state $s_{t+1}$ is given by using a node selection policy $\pi_n$ which selects the next node nt to be branched whose features will be represented by $s_{t+1}$. However, the environment changes independently of the action of the brancher agent as it cannot perceive the actions of the node selection policy resulting in partial observability. To circumvent partial observability, multiple trajectory paths are constructed such that the root-leaf pairs are used as the source-destination pair and each node on the search tree is mapped to a single trajectory. This generated trajectory information is then stored in the replay buffer and used during the training process.

Reward Function R: The goal of our solution is to be able to obtain an optimal solution faster with minimum branching steps as possible. Thus, we define the reward $R_t$ at instance t as follows, $R_t=-1$ where for every step a unit penalty is issued. The cumulative reward of an episode will represent the number of steps to optimal solution as a penalty, thereby encouraging the method to solve in minimum number of steps.

A novel deep reinforcement learning algorithm for variable branching based on transformer architecture is proposed. The state-action value function is approximated using a transformer decoder architecture and aims to learn an optimal actor $\pi^*$ which maximizes the learned state-action value function Q. The state space is encoded using Graph Convolutional Neural Network (GCNN) as the state $s_t$ is represented as a bipartite graph. Two successive passes to perform a single convolution as below, $$c'_p \leftarrow f_c\left(c_p, \sum_q^{(p,q)\in E} g_c(x_q, e_{pq}, c_p)\right),$$

$$x'_q \leftarrow f_x\left(x_q, \sum_q^{(p,q)\in E} g_x(x_q, e_{pq}, c'_p)\right)$$

$\forall p\in C$, $\forall q\in X$, followed by a double layer perceptron with rectified linear unit (ReLU) activation. The critic network uses the masked sum to estimate the state-action value Q. The action generated by the agent at represents the branching variable and the next node $n_t$ to be branched at instance t is selected by a node selection policy. The sub-tree with $n_t$ as the root node is traversed by selecting the leaf with the largest LP gain until a leaf node not yet fathomed is reached. Trajectories are generated for each of the nodes present in the sub-tree and are added to the experience replay buffer. The node selection policy is used when the soft actor-critic agent interacts with the environment and generates a variable for branching during both training and inference phases. However, trajectory generation happens only during training phase having no additional inference-time overhead.

During the initial training phases, the brancher agent is naive due to lack of experience causing random actions to be taken, which can result in sub-optimal initial performance. The experience buffer filled with expert demonstration data at the beginning of training process will help close the performance gap during this time. The proposed solution is provided with tuples of expert demonstration data $\{s_t, a_t, r_t, s_{t+1}, done_t\}$ in the replay buffer during the beginning of training which is gradually phased out in a linear matter as new experience tuples are collected by the brancher agent, to avoid cold-start problem during beginning of training.

Returning to FIG. 2, in step 204, transition functions are applied on the state space to obtain state-to-state transition functions. In one or more embodiments, the transition functions (e.g., 320, FIG. 3) may be generated based on selected variables as discussed above for a given state and applied actions specified in the transition functions.

In step 206, graph embeddings are performed on the state-to-state transition functions to obtain historical transition data. In one or more embodiments, the historical transition data is representable graphically using the graph embeddings. The graph embeddings may include applying the GCNN as discussed in the discussion of FIG. 3.

In step 208, a transformation multi-head attention function is applied on the historical transition data to obtain finalized positional encodings of observation history and feature representations of finalized state-to-state transition functions. In one or more embodiments, the transformation multi-head attention function is a function for processing the historical transition data to generate the positional encodings of observation history and feature representations of finalized state-to-state transition functions. The feature representation may include the variable feature representation xt.

In step 210, an agent deployment is performed on the order processing system based on finalized state-to-state transition functions. In one or more embodiments, the agent deployment is represented as an action applied based on the corresponding state-to-state transition function. The action may be tracked based on the implementation of the agent deployment on the order processing system. Specifically, a determined number of agents deployed for order processing may be tracked along with a volume of orders that occurred during a given point in time.

In step 212, an action-penalty analysis on the historical transition data and feature representations is performed to obtain updated state-to-state transition functions. The value that can be derived out of modifying the forecasted order distribution on an instance t can be approximated by the state-action value function Q(s,a). Due to the sequential nature of the order influx and management, the interactions between the action-penalty analysis module and the order processing activities are modelled as a Markov decision process. An action value function may associated with the Markov decision process is maximized to obtain finalized state-to-state transition functions.

Following the agent deployment of step 212, the method of FIG. 2 may return to step 206 to perform the graph embedding of the updated transition functions and performing an improvement to the agent deployment over time.

To further clarify embodiments of the invention described throughout this disclosure, a non-limiting example is provided in FIG. 4.

EXAMPLE

Consider a scenario in which an order processing system for a business processes fluctuating and/or seasonally-based order volumes tracked each week. The order volumes are tracked as historical time series datasets.

FIG. 4 shows an example system in accordance with one or more embodiments of the invention. The example system illustrates the flow of data or other information using arrows between components of the example system. The components may be, for example, modules or data structures.

The example system includes the historical time series datasets (452) being processed in accordance with FIG. 2 to obtain a forecasting model. The processing includes applying the collective time series datasets (452) to state-to-state transition functions (452). The state-to-state transition functions are applied to a GCNN (456) to obtain historical transition data. The historical transition data, modeled as graph embeddings, are further processed using the transformation multi-head attention function (458) to obtain positional encodings of observation history and feature representations (460). The feature representations include variable feature representations and edge and constraint feature representations $X_t$, $E_t$, $C_t$ as discussed in FIG. 2.

The state-to-state transition functions (454) is used by the agent deployment manager (466) to initiate deployment of the order processing agents (468). For example, for an input of a current point in time, the action-penalty analysis module (462) outputs an expected order volume. Based on the expected order volume, the agent deployment manager (468) modifies the number of available order processing agents (468) used for performing order processing tasks on the expected order volume.

The implementation of the state-to-state transition functions (454) modelling expected order volumes and the actual order volume is tracked. Information corresponding to the headcount and the actual order volume during the implementation and the expected order volume from the state-to-state transition functions (454) are input into the action-penalty analysis module (462). Further, the information is further used to update the next iteration of state-to-state transition functions (454).

The action-penalty analysis module (462) performs the method of FIG. 2 to generate a reward value based on the accuracy of the current state-to-state transition functions (454) of the forecasting model. The reward value and the corresponding state-to-state transition functions (454) are applied to the GCNN (456) and the transformation multi-head attention function (458) for future agent deployments.

The above updating of the action-penalty analysis module (462) may be used to continue a cycle of implementing agent deployment in accordance with an updated forecasting model, and using information from the deployment to further update the forecasting model. In this manner, the state-to-state transition functions (454) improve in accuracy over time.

END OF EXAMPLE

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for optimizing resource use for processing orders. Embodiments disclosed herein provide methods and systems for forecasting future orders and using the forecasts to manage the resources reserved for such orders. For high numbers of orders forecasted, embodiments disclosed herein enable preparation of these high numbers by preemptively deploying additional resources (e.g., agents) for handling the expected high number of orders. Conversely, for low numbers of orders, the number of resources reserved for order processing may be reduced, thus preserving the resource consumption of the order processing system.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing order processing, the method comprising:

obtaining a set of time series datasets associated with the order processing for an order processing system;

generating a state space for the set of time series datasets using bi-partite graph representations for a mixed integer program (MIP);

applying a transition function on the state space to obtain state-to-state transition function;

performing a graph embedding on the state-to-state transition function to obtain historical transition data;

applying a transformer multi-head attention function on the historical transition data to obtain positional encodings of observation history and feature representation;

performing an action-penalty analysis on the historical transition data and feature representation to obtain feature representations and to obtain an updated state-to-state transition functions; and performing an agent deployment on an order processing system based on finalized state-to-state transition functions and based on the updated state-to-state transition functions, wherein the finalized state-to-state transition functions are based on the positional encodings, and wherein the agent deployment comprises adjusting computing resources applied to a number of agents to process orders at a future point in time.

2. The method of claim 1, wherein generating the state space for historical datasets comprises:

converting the time series into selections of agent deployment numbers for a future period of time; and applying a branch and bound method to determine impacts of the selections to obtain selection nodes, wherein the state space comprises the selection nodes and branches associated with the impacts.

3. The method of claim 1, wherein performing the graph embedding comprises applying the state-to-state transition function and external parameters of the order processing system to a graph convolution neural network (GCNN).

4. The method of claim 1, wherein each of the set of time series datasets is associated with an epicenter of an order processing system.

5. A non-transitory computer readable medium comprising computer readable program code, which when executed by a computer processor enables the computer processor to perform a method for managing order processing, the method comprising:

obtaining a set of time series datasets associated with the order processing for an order processing system;

generating a state space for the set of time series datasets using bi-partite graph representations for a mixed integer program (MIP);

applying a transition function on the state space to obtain state-to-state transition function;

performing a graph embedding on the state-to-state transition function to obtain historical transition data;

applying a transformer multi-head attention function on the historical transition data to obtain positional encodings of observation history and feature representation;

performing an action-penalty analysis on the historical transition data and feature representation to obtain feature representations and to obtain an updated state-to-state transition functions; and performing an agent deployment on an order processing system based on finalized state-to-state transition functions and based on the updated state-to-state transition functions, wherein the finalized state-to-state transition functions are based on the positional encodings, and wherein the agent deployment comprises adjusting computing resources applied to a number of agents to process orders at a future point in time.

6. The non-transitory computer readable medium of claim 5, wherein generating the state space for historical datasets comprises:

converting the time series into selections of agent deployment numbers for a future period of time; and applying a branch and bound method to determine impacts of the selections to obtain selection nodes, wherein the state space comprises the selection nodes and branches associated with the impacts.

7. The non-transitory computer readable medium of claim 5, wherein performing the graph embedding comprises applying the state-to-state transition function and external parameters of the order processing system to a graph convolution neural network (GCNN).

8. The non-transitory computer readable medium of claim 5, wherein each of the set of time series datasets is associated with an epicenter of an order processing system.

9. A system, comprising:

a processor; and memory including instructions, which when executed by the processor, perform a method comprising:

obtaining a set of time series datasets associated with the order processing for an order processing system;

generating a state space for the set of time series datasets using bi-partite graph representations for a mixed integer program (MIP);

applying a transition function on the state space to obtain state-to-state transition function;

performing a graph embedding on the state-to-state transition function to obtain historical transition data;

applying a transformer multi-head attention function on the historical transition data to obtain positional encodings of observation history and feature representation;

performing an action-penalty analysis on the historical transition data and feature representation to obtain feature representations and to obtain an updated state-to-state transition functions; and performing an agent deployment on an order processing system based on finalized state-to-state transition functions and based on the updated state-to-state transition functions, wherein the finalized state-to-state transition functions are based on the positional encodings, and wherein the agent deployment comprises adjusting computing resources applied to a number of agents to process orders at a future point in time.

10. The system of claim 9, wherein generating the state space for historical datasets comprises:

converting the time series into selections of agent deployment numbers for a future period of time; and applying a branch and bound method to determine impacts of the selections to obtain selection nodes, wherein the state space comprises the selection nodes and branches associated with the impacts.

11. The system of claim 9, wherein performing the graph embedding comprises applying the state-to-state transition function and external parameters of the order processing system to a graph convolution neural network (GCNN).

* * * * *